INVENTORS
WILFRED H. WATSON
GEORGE BLOOD

ATTORNEY

INVENTORS
WILFRED H. WATSON
GEORGE BLOOD

ATTORNEY

Jan. 8, 1963   W. H. WATSON ET AL   3,071,946
METHOD FOR PRODUCING HOLLOW GLASS ARTICLES
Filed Sept. 15, 1958   5 Sheets-Sheet 3

INVENTORS
WILFRED H. WATSON
GEORGE BLOOD

ATTORNEY

Jan. 8, 1963   W. H. WATSON ET AL   3,071,946
METHOD FOR PRODUCING HOLLOW GLASS ARTICLES
Filed Sept. 15, 1958   5 Sheets—Sheet 4
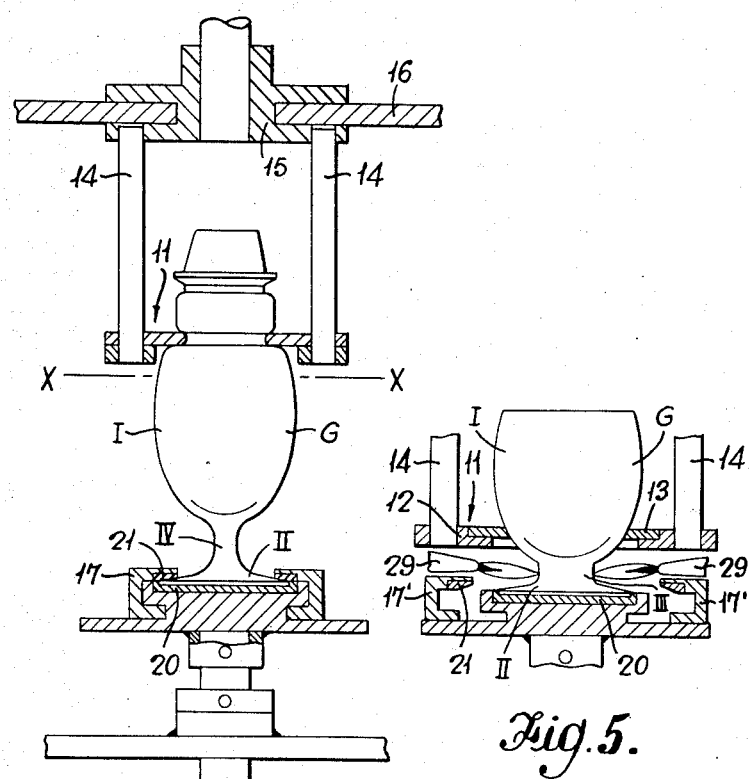
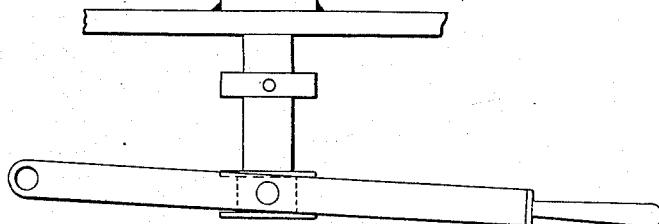
INVENTORS
WILFRED H. WATSON
GEORGE BLOOD
ATTORNEY

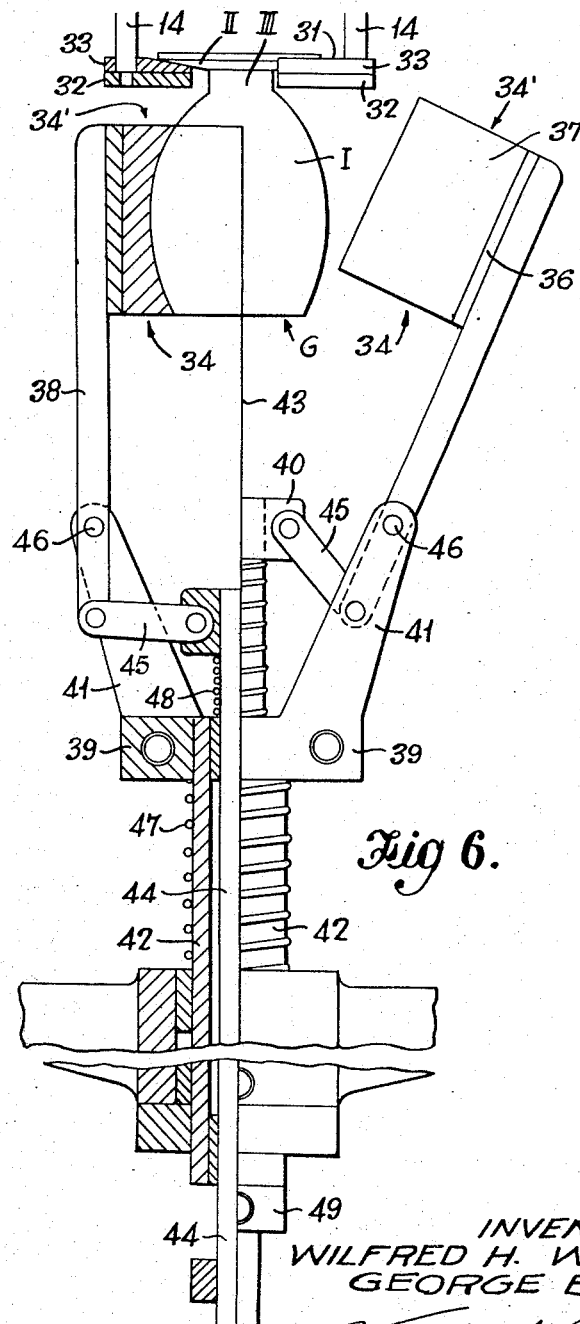

United States Patent Office 3,071,946
Patented Jan. 8, 1963

---

3,071,946
METHOD FOR PRODUCING HOLLOW
GLASS ARTICLES
Wilfred Herbert Watson, Newbold, Chesterfield, and George Blood, Chesterfield, England, assignors, by mesne assignments, to Associated Electrical Industries Limited, London, England, a British company
Filed Sept. 15, 1958, Ser. No. 761,173
Claims priority, application Great Britain Sept. 16, 1957
5 Claims. (Cl. 65—78)

This invention relates to the manufacture of hollow articles of glass or other material which, starting from a viscous state is capable of setting to a solid state after being formed to shape. In particular the invention is concerned with the manufacture, by a machine process as distinct from a hand process of such articles which comprise, as manufactured, a hollow bowl portion and a solid base portion united through an intervening stem portion. Stem-type drinking glasses are an important example of the kind of articles concerned.

In manufacturing stemmed hollow glassware hitherto, it has been common practice to use a process involving three distinct operations, namely a blowing operation in which the bowl portion of the article is formed by blowing in a mould, a pressing operation in which the stem and base of the articles are formed integrally with each other, and a joining operation in which the stem and base portion is joined to the bowl portion while both portions are still hot from their respective forming operations; this joining operation may involve heating the two portions to be joined in order to render them more workable, at least in the region of the joint, and capable of fusing together. Examples of machines for manufacturing stemmed glassware in this way are well known.

Other machine processes which have been proposed but do not appear to have come into widespread commercial use, employ a suction-blowing action by which the bowl portion is formed by blowing in a mould and the base and stem portions are formed simultaneously with the blowing by sucking some of the charge of material into an appropriately shaped lower portion of the mould, or a press-blow-draw action in which the lower portion of a charge of the viscous material is gripped in a mould which integrally forms the base and stem portions, and the upper portion of the charge, indented and subjected to a blowing action, is then drawn out and surrounded by another mould in which the bowl portion of the article is blown into shape. It is to be noted that in this last process the stem portion is formed to its final shape by the pressing action in the first mould and that the drawing action takes place only on that portion of the charge which is to form the bowl portion. These last two processes suffer from several disadvantages of which may be mentioned in particular the fact that since they do not readily lend themselves to the introduction of relative rotation between the mould(s) and the article during formation of the latter, the articles formed thereby would tend to retain mould marks and otherwise have a poor surface finish.

It is an object of the present invention to provide an improved machine process for the manufacture of stemmed ware of glass or other settable material.

In carrying out the present invention, an intermediate, part-formed article having a bowl portion and a foot portion united through an intervening portion of constricted cross-section is first made by a process similar to that of our copending application Serial No. 711,733 of 1958 and comprising the steps of subjecting to a preliminary blowing action a charge of viscous settable material from which the article is to be made, suspending the charge over a surface on to which its lower end is allowed to settle as the charge elongates, subsequently subjecting the charge in a mould to a final blowing action by which the hollow bowl of the article is blown to shape, raising the base of the mould with respect to the remainder thereof to press-mould the settled lower end of the charge into a solid foot united with the hollow bowl portion through an intervening part of constricted cross-section as aforesaid. The mould used is so formed that this intervening part of the part-formed article is of length less than and of cross-section somewhat greater than that required for the finished article. For the purposes of the present invention the part-formed article is taken from the mould when the bowl portion and the foot have set but while the intervening part is still substantially in a workable condition, by which is meant that this intervening part, which takes longer to set because of its greater thickness, has still not fully set or, in the case of a heat softened material such as glass, is still sufficiently hot to be brought to a workable condition by the application of only a relatively small amount of additional heat. The part-formed article having been thus removed from the mould, its intervening part is subjected, in a workable condition, to an elongating step to form the required stem. This elongating step comprises placing the article in an elongating apparatus with its bowl portion and its foot engaged by respective parts of this apparatus, and moving said parts away from one another in the lengthwise direction of the stem.

In producing the intermediate article, assuming it to be of glass, by the above-mentioned process similar to that of said application No. 711,733 of 1958, a Westlake machine modified as described in that application may be employed. By doing so, it is found in practice that on taking the part-formed article from the modified Westlake machine the neck portion is still sufficiently hot to be workable without requiring much additional heating, if any. Consequently the part-formed article thus formed can be taken directly to an apparatus by which the elongation of the neck portion to form the stem of the finished article is effected.

Possible forms for this elongating apparatus, and the essential parts of an apparatus for producing the part-formed article by a process according to our said copending application, are illustrated by way of example in the accompanying drawings which will now be described with reference to the manufacture of stemmed glass-ware and in which:

FIGS. 3 and 4 illustrate the essential parts of an elongating apparatus for the process according to the invention, these two figures, which have their upper portions in cross-section, showing the positional relationship of the parts at respective stages in the elongating procedure;

FIG. 5 is a fragmentary illustration of a possible modification of part of the apparatus of FIGS. 3 and 4;

FIG. 6 is a composite illustration of another form of elongating apparatus, the right-hand half of this figure illustrating the positional relationship of the parts in an "open" position, and the left-hand half illustrating, in cross-section, the positional relationship of the parts in a "closed" position.

The illustrations are all in somewhat schematic form and are given more with the intention of clearly illustrating how the invention can be carried out rather than with any idea of showing detailed constructional features which can readily be imagined by the reader.

Figure 1:
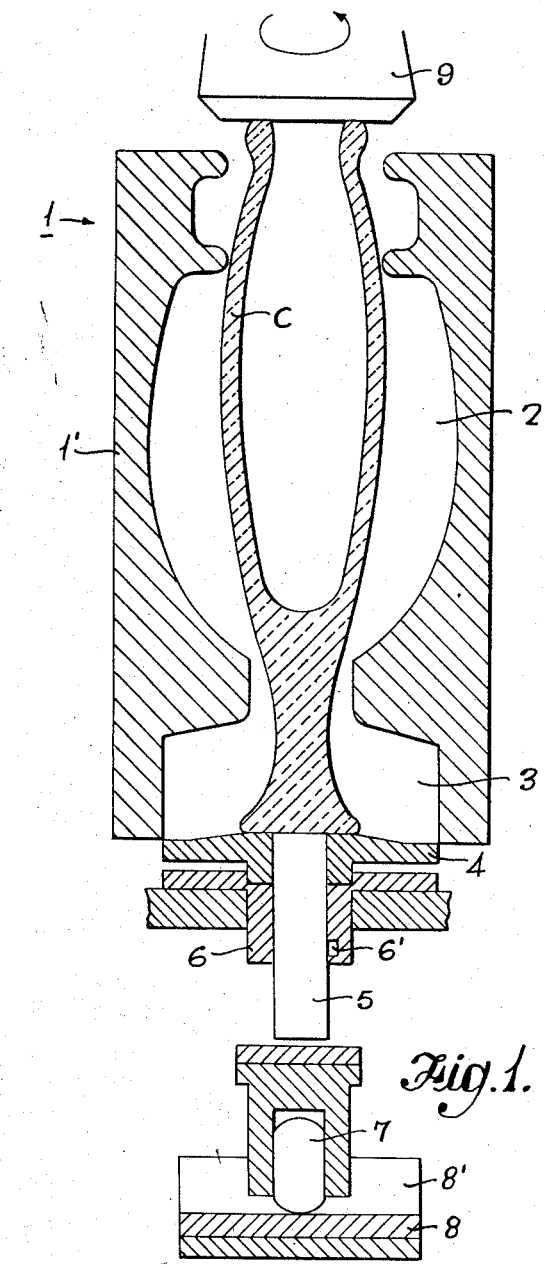
FIGS. 1 and 2 illustrate the essential parts of an apparatus for producing the part-formed article required for the present invention, these two figures showing the positional relationship of the parts at respective stages in the production of the article.
Figure 2:
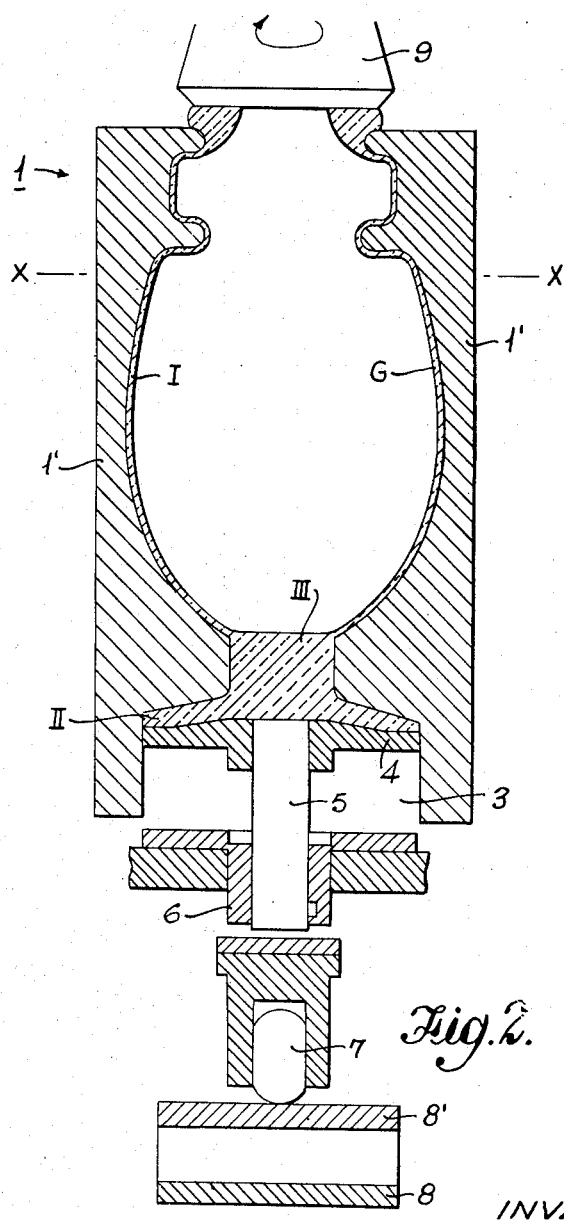

The apparatus as illustrated in FIGS. 1 and 2 for producing the part-formed article includes a split mould 1 comprising two separate halves 1' which when closed together define the sides of a mould cavity 2 the shape of which is determined by the required shape (FIG. 3) for the part-formed article G. At the lower end of the mould 1 the cavity 2 has a vertically sided portion 3 in which can slide a vertically movable base member 4. This base member 4 has a periphery conforming to and fitting within the inner periphery of the vertically sided portion 3 of the cavity 2 and acts piston-wise to constitute a presser for the base II (FIG. 3) of the article. The base member 4 is carried by a stem 5 which is located and guided for vertical movement in a fixed bearing 6. Rotation of the stem 5 and thus of the base member 4 is prevented by keying or pinning 6'. The lower end of the stem 5 is positioned for engagement by a cam follower roller 7 which co-operates with a cam plate 8 having a raised portion 8' which is brought into position under the roller 7 (see FIG. 2) at an appropriate time in the moulding operation.

A rotatable blow tube 9 receives a charge C of molten glass in an upright position and is then swung downwards to position the charge C over the base 4 between the two halves 1' of the mould 1, which at this time are separated (not shown) to allow the charge to enter the mould. This is the usual practice in a Westlake machine. A puff of air having been blown into the charge C as an initial blowing action, the two halves of the mould 1 are then closed round the charge which, being suspended at the now lower end of the blow tube 9 is elongating under its own weight and beginning to settle on the base 4. This is the stage of the operation which is illustrated in FIG. 1 and it will be noted that the base 4 of the mould 1 is at this stage in its lowermost position. The blow tube 9 has been rotating all this time and continues to do so. At an appropriate time a final blowing action on the charge C is initiated, which results in the upper portion of the charge C being formed against the inside of the mould 1 into the shape required for the bowl portion I and neck portion III (FIG. 3) of the part-formed article G. The relative movement between the mould 1 and the cam plate 8 is so controlled that when the raised portion 8' of the cam plate 8 comes under the follower roller 7, the final blowing action on the charge will have resulted in at least partial formation of the bowl portion but the portion of the charge within the lower part 3 of the mould cavity 2 is still in a mouldable state because of its greater mass where it has settled on the base 4. Consequently when the raised portion 8' of the cam plate comes under the roller 7 and thereby causes the stem 5 to raise the base member 4 of the mould, a pressing action is exerted on the lower portion of the charge which is thus pressed up into the required solid base portion II for the article. This is the stage illustrated in FIG. 2. The article G is then removed from the mould by opening the latter and is placed in an elongating apparatus for a neck elongation process in conformity with the invention. Possible forms for this elongating apparatus are illustrated in FIGS. 3–6.

Figure 3:
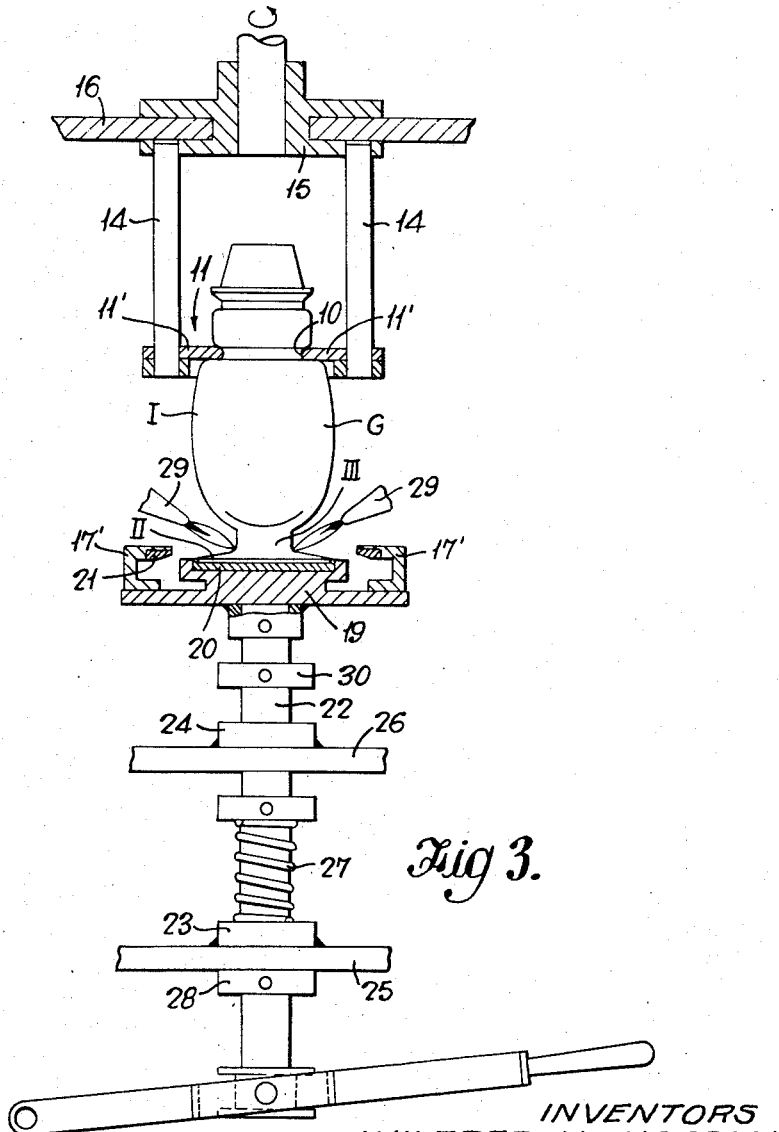

Referring to FIGS. 3 and 4, the elongating apparatus comprises a supporting yoke 11 which receives and supports the part-formed article G in the state in which its bowl portion I and base portion II have set but the constricted neck portion III (FIG. 3), which is thicker and shorter than the stem portion IV (FIG. 4) required in the finished article, has not fully set or at least is still sufficiently hot to be rendered workable by a relatively small amount of heating. The yoke 11, which at least partly embraces the bowl portion of the part-formed article, supports the latter by engaging in a circumferential groove 10 which is formed during the production of the bowl portion I, at a position above the final burn-off line XX, by appropriately shaping the inside of the mould in which the bowl portion I is formed.

Instead of engaging a circumferential groove in the part-formed article, the yoke 11 may support the article by at least partly embracing the neck portion III and engaging the underside of the bowl portion I, this alternative having been illustrated in FIG. 5. In this latter case, no circumferential groove is required on the part-formed article and the elongation of neck portion III may in fact take place after burn-off.

In either case, the yoke 11 may comprise, as assumed for FIGS. 3 and 4, a pair of jaws 11' which close round the article (being shown closed in FIGS. 3 and 4) and are shaped to conform to the part of the article which they engage, these jaws being made of a heat insulating material such as that known as Syndanyo. Alternatively as assumed for FIG. 5, the yoke 11 may comprise a centrally apertured disc or plate 12 slotted from its periphery in order to pass the neck portion III of the article G into central position. The upper surface of this disc or plate 12 has a covering 13 of heat insulation provided for example by a correspondingly shaped piece of Syndanyo or other suitable material.

The yoke 11 (FIGS. 3, 4 and 5) is carried by a structure comprising support rods 14 depending from a rotatable ring 15 which is itself rotatably supported by a fixed support plate 16. Rotation of the ring 15, and with it of the yoke 11 and the article G, is effected by driving the ring 15 in any suitable manner.

The base II of the part-formed article as received by the yoke 11 is gripped by means of a split clamping ring 17, the two parts 17' of which are seen in their open position in FIGS. 3 and 5, and in their closed position in FIG. 4. Semi-annular grooves 18 on the ring parts 17' engage over the peripheral edge of the base portion II of the article G and clamp it to a platform 19. This platform 19 is carried by a vertically movable rod. Heat insulation 20—21 is provided between the article G on the one hand and the platform 19 and clamping ring 17 on the other hand.

The platform 19 is carried by a vertically movable rod 22 guided by bushings 23, 24 secured on respective fixed support plates 25 and 26. A spring 27 urges the rod upwardly to bring the platform to a limiting upper position shown in FIG. 3 and determined by a stop collar 28 on the rod 22 coming into engagement with the underside of support plate 25.

Before closing the clamping ring 17 the neck portion III of the article G, taken in the state previously referred to, is preferably heated to render it more workable by subjecting it to the action of a ring or horseshoe of burners 29 while rotating it by driving the ring 15. The burners 29 are removed before closing the ring 17 (see FIG. 4) and the vertically movable rod 22 is then actuated to bring the platform 19 gently towards a limiting lower position (FIG. 4) determined by a stop collar 30 engaging the upper surface of support plate 26. Since the base II of the article G is clamped to the platform 19, this action produces an elongation of the neck portion III to form the required stem portion IV with a length determined by the position of the collar 30 along the rod 22. The platform 19 is held in its lower position until the stem IV has set, after which a final burn-off can be effected at the level X—X either before or after removing the article from the elongating apparatus.

In the elongating apparatus of FIGS. 3–5, the part-formed article G is received in an upright position. In the alternative form of elongating apparatus illustrated by FIG. 6, the part-formed article G is received in an inverted position by a neck yoke 31 which at least partly embraces the neck III of the article G and supports it by engaging what is the underside of the base II in the inverted position (being the top side in the upright position). The neck yoke 31 may be similar to that described above for the other forms of elongating apparatus and may comprise for instance an apertured disc or plate 32 covered with insulation 33 shaped to conform to the engaged surface of the article base II. The yoke 31 may itself be carried by a structure similar to that for the other forms, only parts of the support rods 14 of such structure being shown in FIG. 6. A bowl-grip 34 comprises jaws 34' which conform on their inside surfaces 35 to the outside shape of the bowl portion I of the article G and can be closed on to the bowl portion I to permit elongation of the neck III by a limited movement of separation between the bowl-grip 34 and the neck yoke 31. The bowl-grip jaws 34', which may comprise metal plates 36 carrying respective shaped insulating blocks 37, again possibly of Syndanyo, on their facing surfaces, are carried by pivoted arms 38 on a mounting member 39 which is vertically movable to permit the required neck elongating movement of separation between the jaws 34' and the neck yoke 31. With the neck yoke 31 fixed, and the jaws 34' closed, the elongation of the neck portion III of the article G can then be effected by downward movement of the mounting member 39. In order to obtain the advantage of enabling the jaws 34' to be closed and the neck elongation to be effected by a single movement, the jaw arms 38 are mechanically linked to an actuating member 40 which is also vertically movable and on being so moved acts through the linkage to close the jaws 34', and subsequently entrains with it the mounting member 39 thereby to effect the neck elongation. Thus in the particular arrangement shown in FIG. 6 the jaw arms 38 are pivoted, at a point in each intermediate its ends, on respective upstanding lugs 41 on the mounting member 39. This mounting member extends transversely of and is secured to an axially movable hollow rod 42 the axis 43 of which is vertical and coincides with the axis of the article G as clamped in the jaws 34'. Within this hollow rod 42 is another, axially movable, actuating rod 44 which extends through the mounting member 39 and has pivoted to it at diametrically opposite positions on the actuating member 40 two links 45 which connect it with the respective jaw arms 38, these links 45 being pivoted with respect to the jaw arms 38 at positions adjacent the remote end of the jaw arms 38 from the jaws 34' themselves. The length and position of the links 45 is chosen so that, starting with the jaws 34' open, as on the right-hand side of the figure, an initial downward movement of the actuating rod 44 (unaccompanied at this time by movement of the outer rod 42) brings the links 45 to a position (left-hand side of figure) at which they have not quite reached horizontal and at which the jaws 34' become fully closed on the bowl portion I of the article G suspended by the neck yoke 31. Beyond this position of the links, continued downward movement of the actuating rod 44, being unable to close the jaws 34' further, acts through the jaw arms 38 and their pivots 46 to entrain for downward movement the mounting member 39 and its rod 42. Downward movement is thereby imparted to the jaws 34' which therefore then exert a downward pull on the bowl portion I of the article G. Since the base II of the latter is fixed, this results in the required elongation of the neck portion III to form the stem of the finished article. The two rods 42 and 44 are spring-loaded by springs 47 and 48 respectively in order to return them to their initial positions when released at the end of the elongating process. This also returns the jaws 34' to their initial position so that they release the article G now formed with its stem. Upward movement of the rods 42 and 44, and therefore the extent of opening of the jaws 34', can be limited by means of a stop collar 49 on the rod 44.

In FIGS. 3 and 4 a hand lever 50 pivoted to the lower end of the rod 22, has been shown for permitting the required elongating downward movement of this rod to be effected manually. A similar hand lever could be pivoted to the lower end of rod 44 in FIG. 6 for the same purpose, or alternatively, in either case, some form of automatic mechanism could be employed.

What we claim is:

1. A machine process for the manufacture from a viscous settable material of a stemmed and footed hollow article, comprising the steps of subjecting a charge of said material to a preliminary blowing action, suspending the charge over a surface on to which its lower end is allowed to settle as the charge elongates, subsequently subjecting the charge to a final blowing action in a mould by which the hollow bowl of the article is blown to shape, raising the base of the mould with respect to the remainder thereof to press-mould the settled lower end of the charge into a solid foot united with the hollow bowl portion through an intervening part of constricted cross-section and of length less than that required for the stem of the finished article, separating the article from the mould when the bowl portion and the foot have set but while said intervening part is still substantially in a workable condition, and subjecting said intervening part in a workable condition to an elongating step to form the required stem, said elongating step comprising placing the article in an elongating apparatus with its bowl portion and its foot engaged by respective parts thereof, and moving said parts away from one another in the lengthwise direction of said stem.

2. A process as claimed in claim 1 in which the article, as placed in the elongating apparatus for the elongating step, is supported therein in an upright position by one of said parts of the elongating apparatus which engages an underneath surface of the bowl of the article and at least partly embraces it, the foot of the article being gripped and overlapped on its upper surface by said other part of the elongating apparatus.

3. A process as claimed in claim 2 wherein the part-formed article as inserted in the elongating apparatus is supported therein by engagement of the underside of the bowl portion of the article.

4. A process as claimed in claim 2 which includes the formation of a circumferential groove in the part-formed article above a burn-off level thereof, and wherein the part-formed article as inserted into the elongating apparatus is supported therein by a supporting engagement with the circumferential groove.

5. A process as claimed in claim 1 wherein the elongation of the neck portion comprises the steps of inserting the part-formed article in an elongating apparatus which supports the part-formed article in an inverted position by at least partly embracing the neck portion thereof and engaging the downwardly facing topside of the base portion, and gripping the article by engagement of the outside surface of the bowl portion of the article during the elongation of the neck.

References Cited in the file of this patent

UNITED STATES PATENTS

| 1,603,524 | Dunbar | Oct. 19, 1924 |
| 1,908,306 | Best | May 9, 1933 |
| 1,972,717 | Schutz | Sept. 4, 1934 |
| 2,276,399 | Hrdina | Mar. 17, 1942 |
| 2,331,413 | Model | Oct. 12, 1943 |
| 2,655,766 | Haden | Oct. 20, 1953 |
| 2,790,994 | Cardot et al. | May 7, 1957 |

FOREIGN PATENTS

| 617,445 | Great Britain | Feb. 7, 1949 |
| 678,686 | Great Britain | Sept. 3, 1952 |
| 1,119,739 | France | Apr. 9, 1956 |